US008954260B2

(12) United States Patent
Gandhi et al.

(10) Patent No.: US 8,954,260 B2
(45) Date of Patent: Feb. 10, 2015

(54) METHOD AND SYSTEM FOR COLLISION ASSESSMENT FOR VEHICLES

(75) Inventors: Daniel Gandhi, Novi, MI (US); Chad T. Zagorski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 958 days.

(21) Appl. No.: 12/816,209

(22) Filed: Jun. 15, 2010

(65) Prior Publication Data

US 2011/0307175 A1 Dec. 15, 2011

(51) Int. Cl.
| | |
|---|---|
| *G06F 19/00* | (2011.01) |
| *G06G 7/70* | (2006.01) |
| *G06G 7/76* | (2006.01) |
| *G08G 1/00* | (2006.01) |
| *G08G 1/16* | (2006.01) |
| G06G 7/78 | (2006.01) |
| G06F 17/10 | (2006.01) |
| G08G 9/02 | (2006.01) |

(52) U.S. Cl.
CPC .................. *G08G 1/166* (2013.01); *G06G 7/78* (2013.01); *G06F 17/10* (2013.01); *G08G 9/02* (2013.01)
USPC .................... 701/117; 701/6; 701/14; 701/16; 701/24; 701/25; 701/72; 701/79; 701/116; 701/122

(58) Field of Classification Search
CPC ........... G06F 15/50; G06F 17/10; G06G 7/78; F41G 9/02; G08G 9/02
USPC .......... 701/6, 14, 16, 72, 79, 24, 25, 117, 122
See application file for complete search history.

(56) References Cited

U.S. PATENT DOCUMENTS

| 3,260,478 | A | * | 7/1966 | Welti ........................... 244/3.14 |
|---|---|---|---|---|
| 4,234,142 | A | * | 11/1980 | Yost et al. .................... 244/3.21 |
| 4,623,966 | A | * | 11/1986 | O'Sullivan .................... 701/301 |
| 4,802,096 | A | * | 1/1989 | Hainsworth et al. .......... 701/301 |
| 5,281,901 | A | * | 1/1994 | Yardley et al. ................ 318/587 |
| 5,367,458 | A | * | 11/1994 | Roberts et al. ................. 701/25 |
| 5,400,244 | A | * | 3/1995 | Watanabe et al. ............... 701/28 |
| 5,926,126 | A | * | 7/1999 | Engelman ........................ 342/70 |
| 6,466,863 | B2 | * | 10/2002 | Shirai et al. ................... 701/400 |
| 6,651,004 | B1 | * | 11/2003 | Perruzzi et al. ............... 701/302 |
| 7,124,027 | B1 | * | 10/2006 | Ernst et al. .................... 701/301 |
| 7,295,227 | B1 | * | 11/2007 | Asahi et al. ................... 348/118 |
| 7,447,592 | B2 | | 11/2008 | Yopp et al. |
| 7,522,091 | B2 | * | 4/2009 | Cong et al. ...................... 342/70 |
| 7,626,533 | B2 | * | 12/2009 | Cong et al. ...................... 342/70 |
| 7,769,512 | B2 | * | 8/2010 | Norris et al. .................... 701/44 |
| 7,831,368 | B2 | * | 11/2010 | Schroder ........................ 701/96 |
| 8,428,843 | B2 | * | 4/2013 | Lee et al. ........................ 701/93 |

OTHER PUBLICATIONS

German Patent and Trade Mark Office, Office Action in German Patent Application No. 10 2011 103 795.4, mailed Jul. 10, 2013.
State Intellectual Property Office of the People's Republic of China, Office Action for Chinese Patent Application No. 201110160573.7, mailed Sep. 30, 2013.

* cited by examiner

*Primary Examiner* — John Q Nguyen
*Assistant Examiner* — James E Stroud
(74) *Attorney, Agent, or Firm* — Ingrassia Fisher & Lorenz, P.C.

(57) ABSTRACT

Methods and systems are provided for assessing a target proximate a vehicle. A location and a velocity of the target are obtained. The location and the velocity of the target are mapped onto a polar coordinate system via a processor. A likelihood that the vehicle and the target will collide is determined using the mapping.

12 Claims, 6 Drawing Sheets

METHOD AND SYSTEM FOR COLLISION ASSESSMENT FOR VEHICLES

TECHNICAL FIELD

The present invention generally relates to the field of vehicles and, more specifically, to methods and systems for assessing targets that may collide with the vehicle.

BACKGROUND

Certain vehicles today include systems for monitoring movement of the vehicle relative to nearby vehicles and providing pertinent information thereof to drivers of the vehicles. For example, certain vehicles include a system that provides a determination as to whether a nearby target (such as another vehicle) is likely to collide with the vehicle on which the system resides and an estimated time of such a collision. However, such systems may not always optimally provide such determinations, particularly when the target is first detected, for example if the vehicle is travelling a curved surface.

Accordingly, it is desirable to provide an improved method for assessing targets near a vehicle, for example that assesses a likelihood of a collision between a host vehicle and a nearby target when the vehicle is travelling along a curved surface. It is also desirable to provide an improved system for assessing targets near a vehicle, for example that assesses a likelihood of a collision between a host vehicle and a nearby target when the vehicle is travelling along a curved surface. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method for assessing a target proximate a vehicle is provided. The method comprises the steps of obtaining a location and a velocity of the target, mapping the location and the velocity onto a polar coordinate system via a processor, and determining a likelihood that the vehicle and the target will collide using the mapping.

In accordance with another exemplary embodiment, a method for assessing a target proximate a vehicle is provided. The method comprises the steps of identifying a location and a velocity of the target, identifying a turn center, a trajectory, and a turn radius of the vehicle, calculating a first estimated time value at which the target is expected to reach the trajectory using the location and the velocity, calculating a second estimated time value at which the vehicle will contact the target if the vehicle and the target were to collide using the turn center and the turn radius, and determining that a collision between the vehicle and the target is likely if the first estimated time value is less than or equal to the second estimated time value via a processor.

In accordance with a further exemplary embodiment, a system for assessing a target proximate a vehicle is provided. The system comprises a detection unit and a processor. The detection unit is configured to provide information pertaining to a location and a velocity of the target. The processor is coupled to the detection unit, and is configured to map the location and the velocity onto a polar coordinate system, generating a mapping, and determine a likelihood that the vehicle and the target will collide using the mapping. The polar coordinate system has a pole comprising a turn center of the vehicle.

Furthermore, other desirable features and characteristics of the methods and systems will be apparent from the subsequent detailed description and the appended claims, taken in conjunction with the accompanying drawings and the foregoing technical field and background.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature, and is not intended to limit the disclosure or the application and uses thereof.

Figure 1:
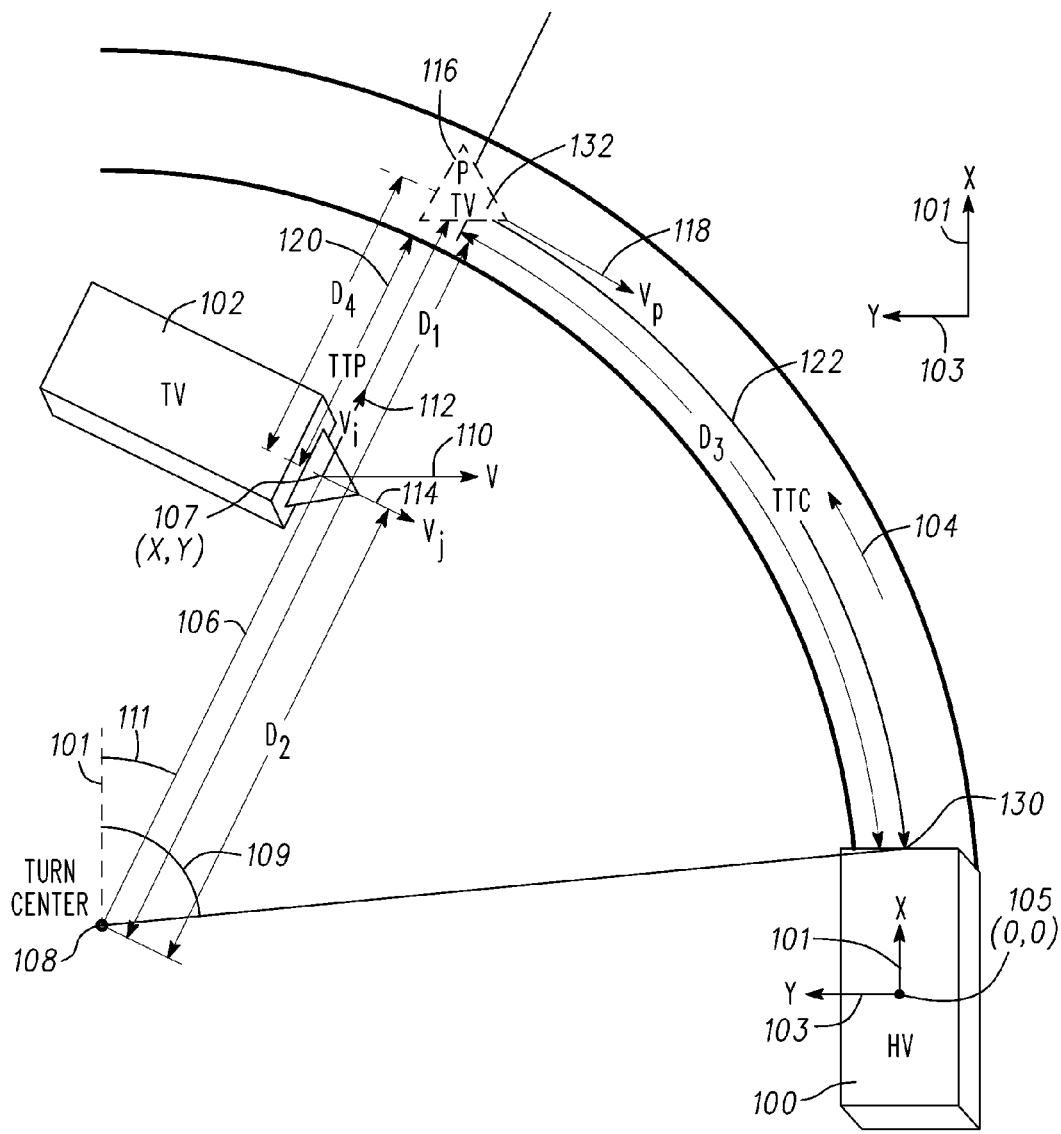
FIG. 1 is a schematic drawing showing a host vehicle, a target near the host vehicle, and a mapping of the target's location and velocity onto a polar coordinate system based on a turn center of the host vehicle, for use in assessing the target and making determinations regarding a likelihood of collision between the host vehicle and the target, in accordance with an exemplary embodiment.

FIG. 1 is a schematic drawing showing a host vehicle 100 and a target 102 near the host vehicle 100, in accordance with an exemplary embodiment. The target 102 could be a vehicle, but the target 102 may also represent other types of moving objects, such as projectiles, or non-moving objects.

The host vehicle 100 and the target 102 are depicted in their current locations relative to one another. The host vehicle 100 is travelling along a host vehicle trajectory 104 on a curved surface with a turn center 108 and a turn radius 106 having a length or distance D1. The host vehicle 100 and the target 102 are proximate one another. As referenced herein, "proximate" means that the host vehicle 100 and the target 102 are in close enough proximity whereby a collision is possible therebetween. In one example, the host vehicle 100 and the target 102 may be proximate to one another if they are within one hundred feet of one another. In another example, the host vehicle 100 and the target 102 may be proximate to one another if they are within five hundred feet of one another. In yet another example, the host vehicle 100 and the target 102 may be proximate to one another if they are within one thousand feet of one another. This may vary in different embodiments and/or with different vehicles, vehicle speeds, driving surfaces, driving conditions, and/or various other factors.

A velocity vector (v) 110 represents a current velocity of the target 102 relative to the host vehicle 100. The velocity vector (v) 110 includes velocity components $v_i$ 112 and $v_j$ 114, in which velocity component $v_i$ 112 is along the radius 106 from the turn center 108, and velocity component $v_j$ 114 is perpendicular to the radius 106 of the turn center 108. As explained further below in connection with FIGS. 2-9, the velocity vector (v) 110 is used to calculate a time to path (TTP) 120 at which the target 102 is expected to reach the host vehicle trajectory 104.

The current relative locations of the host vehicle 100 and the target 102 are depicted in FIG. 1 in accordance with a Cartesian coordinate system. The Cartesian coordinate system has an x-axis 101 and a y-axis 103 with its origin (0,0) located at a center of gravity 105 of the host vehicle 100. A center of a closest plane 107 of the target 102 with respect to the host vehicle trajectory 104 is also depicted as point (x,y) in FIG. 1 in accordance with the Cartesian coordinate system.

FIG. 1 also represents a mapping (for example, of the location and velocity of the target 102) from the Cartesian coordinate system onto a polar coordinate system. The host vehicle turn center 108 serves as the pole of the polar coordinate system, and the x-axis 101 serves as the polar axis of the polar coordinate system. The mapping is conducted in accordance with the systems and methods described further below in connection with FIGS. 2-9, and is utilized in conjunction therewith to assess a likelihood of a collision between the host vehicle 100 and the target 102.

A projected target 116 represents a placement of the target 102, using the mapping onto the polar coordinate system, at a closest portion (preferably, a closest point) of the host vehicle trajectory 104 that is closest to the target 102. The projected target 116 is preferably determined by a point of intersection between the turn radius 106 and the host vehicle trajectory 104. Thus, the first distance D1, which represents the length or distance of the turn radius 106 of the host vehicle 100, also represents the distance between the turn center 108 and the projected location 116. In the depicted embodiment, a center 130 of a front bumper of the host vehicle 100 is also depicted in the host vehicle trajectory 104. The distance between the center 130 and the turn center 108 is approximately, although not exactly, equal to the first distance D1.

A center of a closest plane 132 (or a closest face or side facing the host vehicle 100) of the projected target 116 in the host vehicle trajectory 104 is disposed a distance from the host vehicle turn center 108 that is at least approximately equal to the first distance D1, based on a working assumption that the host vehicle trajectory 104 is circular. The center of the closest plane 107 of the target 102 is a second distance D2 from the host vehicle turn center 108. In the depicted embodiment, the second distance is less than the first distance. However, this may vary in other embodiments.

The center 130 of the front bumper of the host vehicle 100 is a third distance D3 from the center of the closest plane 132 of the projected target 116 along the host vehicle trajectory 104, and the center of the closest plane 107 of the target 102 is a fourth distance D4 from the center of the closest plane 132 of the projected target 116. In addition, the host vehicle 100 is disposed at a first angle 109 from the x-axis 101, and the target 102 is disposed at a second angle 111 from the x-axis 101. In the depicted embodiment, the first angle 109 is greater than the second angle 111. However, this may vary in other embodiments.

A scaled velocity $v_p$ 118 represents a velocity component of the target 102 at the projected target 116 location in a direction that is tangent to the host vehicle trajectory 104. As explained further below in connection with FIGS. 2-9, the scaled velocity $v_p$ 118 is also generated using the mapping, and is used to calculate a time to collision (TTC) 122 between the host vehicle 100 and the target 102 if such a collision is likely to occur. Specifically, the time to collision 122 represents an amount of time until the host vehicle 100 is expected to reach the location of the projected target 116.

Figure 2:
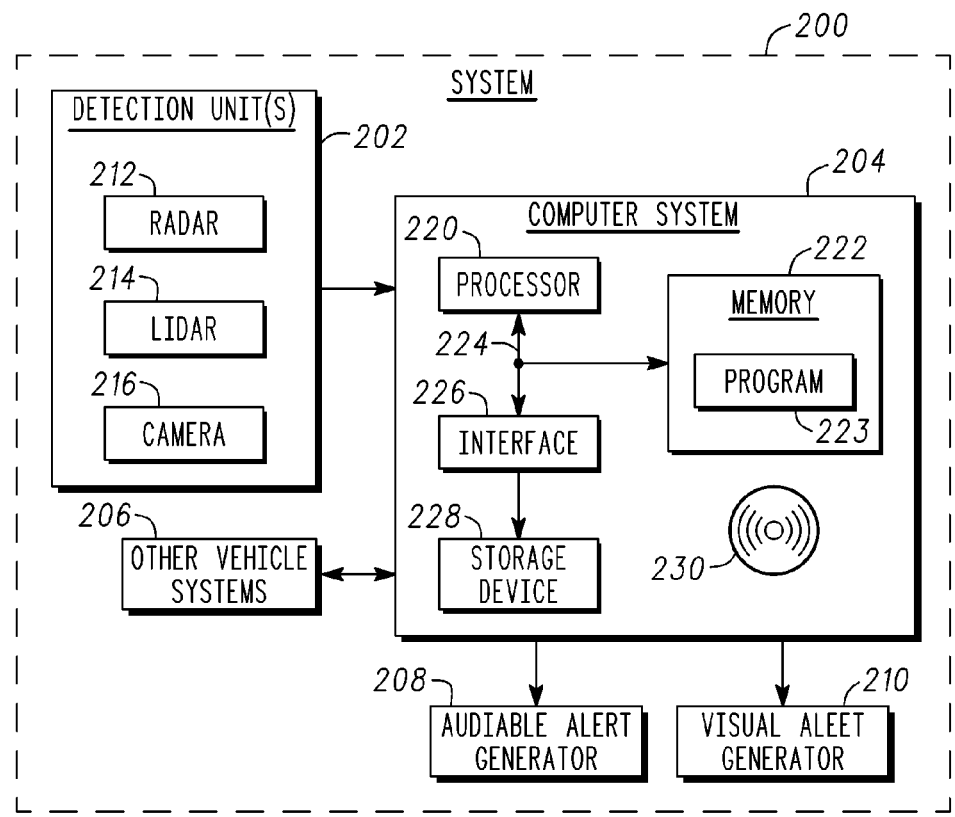
FIG. 2 is a functional block diagram of a system for assessing targets near a vehicle and a likelihood of collision therebetween, and that can be implemented in connection with the mapping of FIG. 1, in accordance with an exemplary embodiment.

FIG. 2 is a functional block diagram of a system 200 for assessing targets near a vehicle and a likelihood of collision therebetween, in accordance with an exemplary embodiment. The system 200 can be utilized in connection with the host vehicle 100 and mapping of FIG. 1. Specifically, the system 200 is preferably disposed onboard the host vehicle 100 of FIG. 1, and implements and utilizes the mapping of FIG. 1 to assess the target 102 of FIG. 1 and the likelihood of a collision between the host vehicle 100 and the target 102. As depicted in FIG. 2, the host vehicle 100 includes one or more detection units 202, a computer system 204, other vehicle systems 206 (such as an automatic braking generator and/or a collision avoidance controller), an audible alert generator 208, and a visual alert generator 210.

The detection units 202 measure a location and a velocity of the target. Preferably, the detection units 202 measure a relative location and relative velocity of the target with respect to the host vehicle. With reference to FIG. 1, the detection units 202 measure the location of the target 102 as well as the velocity vector (v) 110 and the velocity components $v_i$ 112 and $v_j$ 114 thereof with respect to the Cartesian coordinate system. Preferably the detection units 202 include one or more of the following: a radar system 212, a lidar system 214, and/or a camera system 216. In certain embodiments, one or more of the detection units 202 may reside on a separate system, such as one or more of the other vehicle systems 206 (for example, as part of an existing lane departure warning system (LDWS) or side blind zone alert (SBZA) system of the host vehicle). In either case, the location and velocity measurements are provided to the computer system 204 for processing.

The other vehicle systems 206 provide information to the computer system 204 as to a current location, velocity, and trajectory of the host vehicle. The other vehicle systems 206 may include, for example, inertial sensors or systems, wheel sensors or systems, steering column sensors or systems, and/or global positioning device (GPS) systems (not depicted in FIG. 1) that provide measurements and/or other information to the computer system 204 as to the current location, velocity, and trajectory of the host vehicle, and/or transmitters and receivers for communication with a central control center or processor (also not depicted in FIG. 1) via a wireless network and/or for communicating with other vehicles using vehicle-to-vehicle communications.

The computer system 204 is coupled to the detection units 202, the other vehicle systems 206, and the audible and visual alert generators 208, 210. The computer system 204 processes the measurements provided by the detection units 202 and the other vehicle systems 206. The computer system 204 utilizes the processed information to generate the mapping onto the polar coordinate system of FIG. 1, calculate a time to path (TTP) as to when the target is expected to reach the host vehicle trajectory, calculate a time to collision (TTC) at which the target and the host vehicle are expected to collide if such a collision is likely, and assess the likelihood of such a collision based on the time to path (TTP) and the time to collision (TTC).

The computer system 204 includes a processor 220, a memory 222, a computer bus 224, an interface 226, and a storage device 228. In addition, while the detection units 202 are depicted outside the computer system 204, it will be appreciated that the detection units 202 may be a part of the computer system 204 in various embodiments.

The processor 220 performs the computation and control functions of the computer system 204 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 220 executes one or more programs 223 preferably stored within the memory 222 and, as such, controls the general operation of the computer system 204. The processor 220 generates the mapping of the target location and the velocity onto the polar coordinate system, calculates the time to path (TTP) and time to collision (TTC), and asses the likelihood of such a collision, preferably in accordance with the steps described further below in connection with the process 300 of FIG. 3. The processor 220 may also be configured to provide or assist with providing various alerts based on the determinations as to a likelihood and/or a time of a collision, and/or may take control or assist with taking control of the host vehicle (for example, the braking, acceleration, and/or steering of the host vehicle) based on the determinations as to a likelihood and/or a time of a collision.

As referenced above, the memory 222 stores a program or programs 223 that execute one or more embodiments of processes such as the process 300 described below in connection with FIG. 3 and/or various steps thereof. The memory 222 can be any type of suitable memory, including various types of dynamic random access memory (DRAM) such as SDRAM, the various types of static RAM (SRAM) and/or various types of non-volatile memory (PROM, EPROM, and flash). It should be understood that the memory 222 may be a single type of memory component, or it may be composed of many different types of memory components. In addition, the memory 222 and the processor 220 may be distributed across several different computers that collectively comprise the computer system 204. For example, a portion of the memory 222 may reside on a computer within a particular apparatus or process, and another portion may reside on a remote computer. In a preferred embodiment, the memory 222 is located on, or at least co-located with the processor 220 on the same chip.

The computer bus 224 serves to transmit programs, data, status and other information or signals between the various components of the computer system 204. The computer bus 224 can be any suitable physical or logical means of connecting computer systems and components. This includes, but is not limited to, direct hard-wired connections, fiber optics, infrared and wireless bus technologies.

The interface 226 allows communication to the computer system 204, for example from a vehicle occupant, a system operator, and/or another computer system, and can be implemented using any suitable method and apparatus. In certain embodiments, the interface 226 provides the information from the detection units 202 to the processor 220 and provides any warnings or other instructions from the processor 220 directly or indirectly to the driver and/or other occupants of the host vehicle 100 and/or any nearby vehicles, and/or for the processor 220 to take control of the host vehicle (for example, the braking, acceleration, and/or steering of the host vehicle). The interface 226 can include one or more network interfaces to communicate within or to other systems or components, one or more terminal interfaces to communicate with technicians, and one or more storage interfaces to connect to storage apparatuses such as the storage device 228.

The storage device 228 can be any suitable type of storage apparatus, including direct access storage devices such as hard disk drives, flash systems, floppy disk drives and optical disk drives. In one exemplary embodiment, the storage device 228 is a program product from which memory 222 can receive a program 223 that executes one or more embodiments of the process 300 of FIG. 3 and/or steps thereof as described in greater detail further below. In one embodiment, such a program product can be implemented as part of, inserted into, or otherwise coupled to the system 200. As shown in FIG. 2, the storage device 228 can comprise a disk drive device that uses disks 230 to store data. As one exemplary implementation, the computer system 204 may also utilize an Internet website, for example for providing or maintaining data or performing operations thereon.

It will be appreciated that while this exemplary embodiment is described in the context of a fully functioning computer system, those skilled in the art will recognize that the mechanisms of the present disclosure are capable of being distributed as a program product in a variety of forms using computer-readable media used to carry out the distribution. Examples of computer-readable media include: flash memory, floppy disks, hard drives, memory cards and optical disks (e.g., disk 230). It will similarly be appreciated that the computer system 204 may also otherwise differ from the embodiment depicted in FIG. 2, for example in that the computer system 204 may be coupled to or may otherwise utilize one or more remote computer systems and/or other control systems.

Figure 3A:
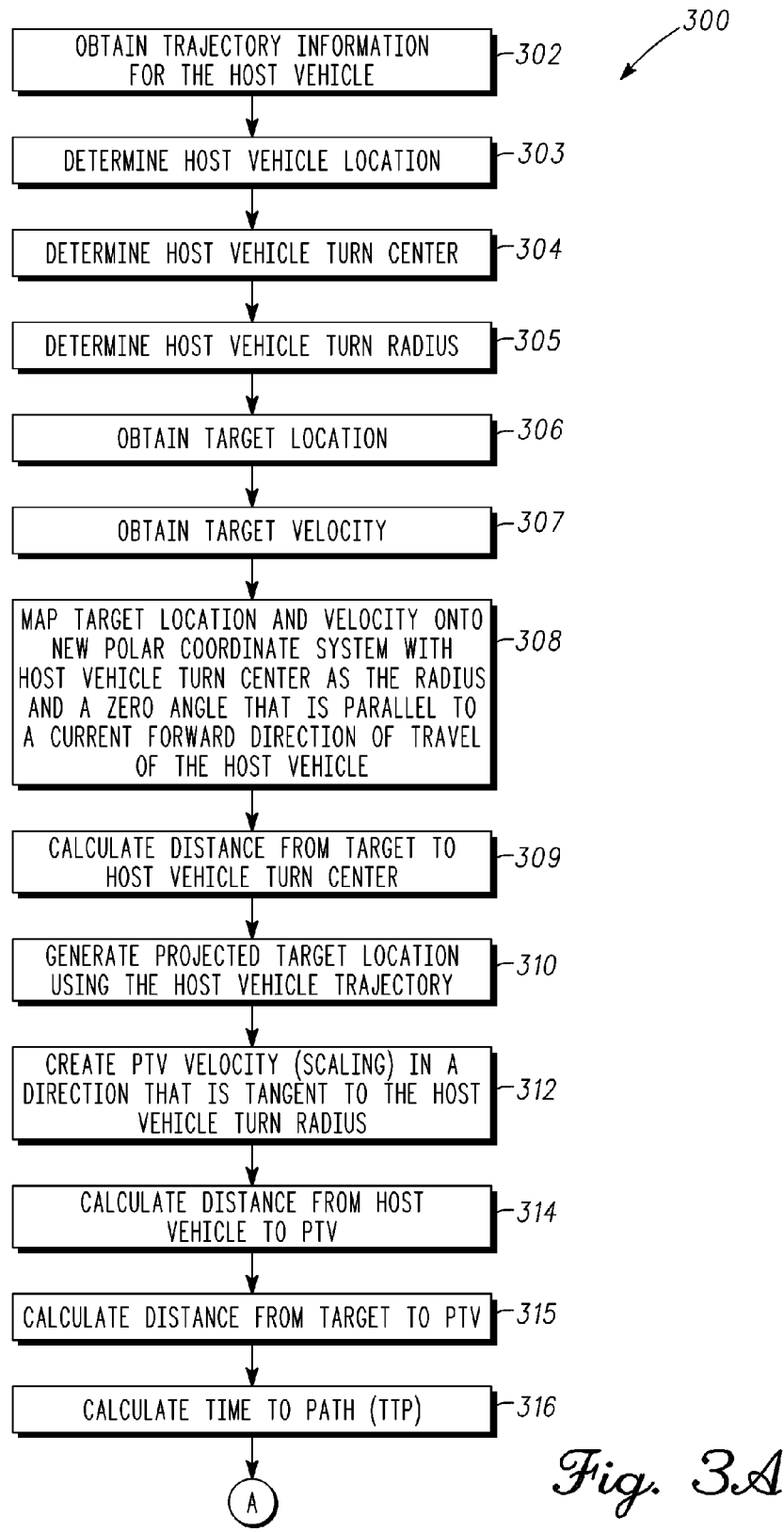
FIG. 3 is a flowchart of a process for assessing targets near a vehicle and a likelihood of collision therebetween, and that can be implemented in connection with the mapping of FIG. 1 and the system of FIG. 2, in accordance with an exemplary embodiment.
Figure 3B:
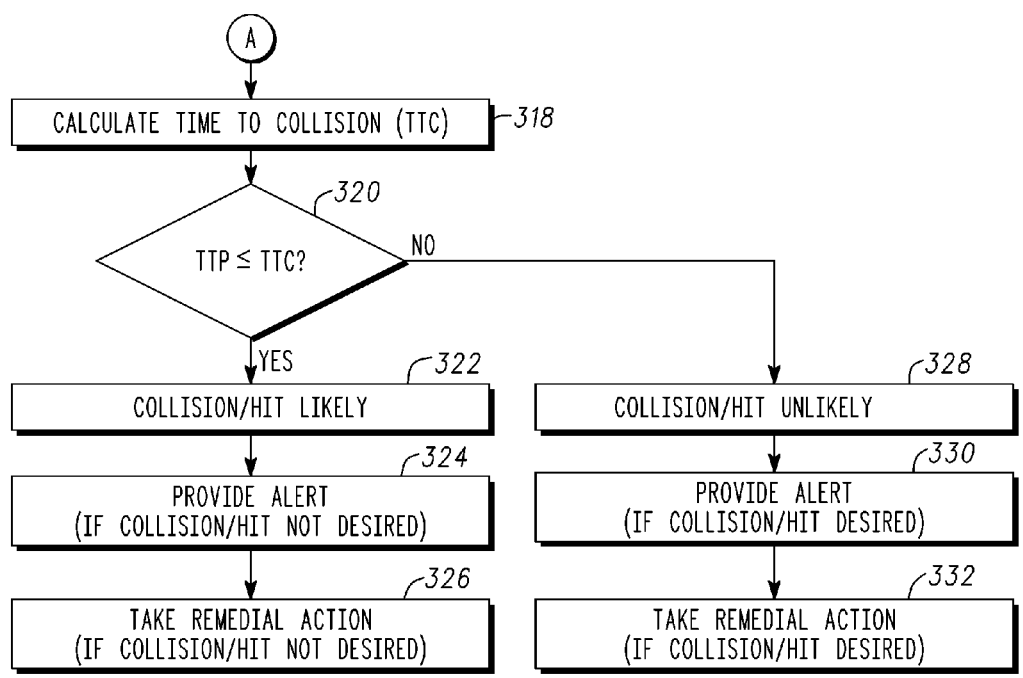

FIG. 3 is a flowchart of a process 300 for assessing targets near a vehicle and a likelihood of collision therebetween, in accordance with an exemplary embodiment. The process 300 can be implemented in connection with the host vehicle 100, the target 102, and the mapping of FIG. 1 and the system 200 of FIG. 2.

As depicted in FIG. 3, the process begins with the step of obtaining information pertaining to a trajectory of the host vehicle (step 302). In step 302, the processor 220 of FIG. 2 preferably obtains information as to a trajectory or path of the host vehicle, and may also include other information pertaining to host vehicle acceleration, wheel angles, wheel slip, wheel movement, steering column angles or movement, global positioning system (GPS) information, and/or inertial sensor information, and determines the host vehicle trajectory based on such information. Alternatively, the host vehicle trajectory may already be determined by one of the other vehicle systems 206 of FIG. 2 (for example, via a separate processor) and provided to the processor 220 of FIG. 2 during step 302. The trajectory information is preferably obtained continuously during vehicle operation during various iterations of step 302, and current values thereof are preferably utilized by the processor 220 of FIG. 2 for processing.

In certain embodiments, a location of the host vehicle is determined (step 303) using the information from step 302. The host vehicle location preferably represents a location of a center of a front bumper of the host vehicle, corresponding to the center 130 of FIG. 1. The host vehicle location is preferably determined by the processor 220 of FIG. 2. Alternatively, the host vehicle location may already be determined by one of the other vehicle systems 206 of FIG. 2 (for example, via a separate processor) and provided to the processor 220 of FIG. 2 during step 303. The host vehicle location is preferably determined continuously during vehicle operation during various iterations of step 303, and current values thereof are preferably utilized by the processor 220 of FIG. 2 for processing.

The host location of step 303, if performed, preferably comprises an absolute location of the host vehicle with respect to the ground (e.g., the road on which the host vehicle is travelling). In certain embodiments, such an absolute location of the host vehicle can be used in connection with vehicle to vehicle communications (for example, using a global positioning system (GPS) device) or a central controller (not onboard the vehicle, and remote from the vehicle, for example, as coupled to the vehicle and/or a global positioning system (GPS) thereof via a wireless network) in order to generate relative distance remote from the vehicle. In certain embodiments, an absolute velocity of the host vehicle with respect to the ground is also obtained in step 303. In certain other embodiments, however, step 303 need not be performed. For example, in certain embodiments, the absolute location of the host vehicle is not needed, because only relative location, movement, and velocities of the target are determined with respect to (i.e., relative to) the host vehicle.

A turn center of the host vehicle is determined (step 304), preferably using the information from step 302. The host vehicle turn center is preferably determined by the processor 220 of FIG. 2. Alternatively, the host vehicle turn center may already be determined by one of the other vehicle systems 206 of FIG. 2 (for example, via a separate processor) and provided to the processor 220 of FIG. 2 during step 304. In either case, the host vehicle turn center preferably corresponds to the host vehicle turn center 108 of FIG. 1. The host vehicle turn center is preferably determined continuously during vehicle operation during various iterations of step 304, and current values thereof are preferably utilized by the processor 220 of FIG. 2 for processing.

A turn radius of the host vehicle is determined (step 305), also using the information from step 302. The host vehicle turn radius is preferably determined by the processor 220 of FIG. 2. Alternatively, the host vehicle turn radius may already be determined by one of the other vehicle systems 206 of FIG. 2 (for example, via a separate processor) and provided to the processor 220 of FIG. 2 during step 305. In either case, the host vehicle turn radius preferably corresponds to the turn radius 106 having a first distance D1 of FIG. 1. The host vehicle turn radius is preferably determined continuously during vehicle operation during various iterations of step 305, and current values thereof are preferably utilized by the processor 220 of FIG. 2 for processing.

In addition, a location of the target is obtained (step 306). The target location is preferably obtained as a center of the closest plane 107 of the target 102 of FIG. 1 relative to the host vehicle 100 of FIG. 1, in accordance with the Cartesian coordinate system of FIG. 1 (in which the host center of front bumper 130 is used as the origin). The target location is preferably measured by one or more detection units 202 of FIG. 2 and provided to the processor 220 of FIG. 2. Alternatively, the target location may be determined by one or more other vehicle systems 206 and provided to the processor 220. The processor 220 of FIG. 2 may also determine the target location based on information provided to the processor 220 by one or more detection units 202 and/or other vehicle systems 206 of FIG. 2. The target location is preferably obtained continuously during vehicle operation during various iterations of step 306, and current values thereof are preferably utilized by the processor 220 of FIG. 2 for processing.

A velocity of the target is also obtained (step 307). The target velocity preferably includes the velocity vector (v) 110, representing a relative velocity of the target with respect to the host vehicle using the Cartesian coordinate system of FIG. 1, and having relative velocity components $v_i$ 112 (along a radius 106 from the turn center 108) and $v_j$ 114 (perpendicular to the radius 106 from the turn center 108) of FIG. 1. The target velocity is preferably measured by one or more detection units 202 of FIG. 2 and provided to the processor 220 of FIG. 2. Alternatively, the target velocity may be determined by one or more other vehicle systems 206 and provided to the processor 220. In yet another example, the processor 220 of FIG. 2 may determine the target velocity based on information provided to the processor 220 by one or more detection units 202 and/or other vehicle systems 206 of FIG. 2. The target velocity is preferably obtained continuously during vehicle operation during various iterations of step 307, and current values thereof are preferably utilized by the processor 220 of FIG. 2 for processing.

The location and velocity of the target are mapped onto a polar coordinate system (step 308). The mapping of step 308 corresponds to the mapping of FIG. 1, and is preferably conducted by the processor 220 of FIG. 1. The polar coordinate system has, as its pole, the host vehicle turn center of step 304 (corresponding to the host vehicle turn center 108 of FIG. 1). The polar coordinate system has, as its polar axis, the x-axis 101 of FIG. 1. In addition, the polar coordinate system has a zero angle that is parallel to a current forward direction of travel of the host vehicle. The mapping provides a first angle (corresponding to the first angle 109 of FIG. 1) at which the host vehicle is disposed relative to the polar axis, and a second angle (corresponding to the second angle 111 of FIG. 1) at which the target is disposed relative to the polar axis. The mapping is preferably conducted continuously during vehicle operation during various iterations of step 308, and a current mapping is preferably utilized by the processor 220 of FIG. 2 for processing.

A distance is calculated between the target and the host vehicle turn center, using the mapping (step 309). The distance between the target and the host vehicle turn center corresponds to the second distance D2 between a closest plane 107 (preferably, representing a center of a closest plane, face, or side of the target 102 most nearly facing the host vehicle 100, or that is visible from the host vehicle 100) of the target 102 of FIG. 1 and the host vehicle turn center 108. The distance of step 309 is preferably calculated by the processor 220 of FIG. 2 continuously during vehicle operation during various iterations of step 309, and current values thereof are preferably utilized by the processor 220 of FIG. 2 for processing.

A projected target location is generated (step 310), using the mapping of step 308. The projected target location corresponds to a closest portion of the host vehicle trajectory 104 of FIG. 1 with respect to the target 102 of FIG. 1. Specifically, in one preferred embodiment, the projected target location represents a point along the host vehicle trajectory 104 of FIG. 1 that is closest to the target 102 of FIG. 1. The projected target location of step 310 preferably corresponds to the location of the projected target 116 of FIG. 1, and is preferably determined in step 310 by identifying a point of intersection between the turn radius 106 of FIG. 1 and the host vehicle trajectory 104 of FIG. 1. The projected target location of step 310 is preferably generated by the processor 220 of FIG. 2 using the host vehicle trajectory of step 302, the target location of step 306, the target velocity of step 307, and the mapping of step 308. The projected target location is preferably generated continuously during vehicle operation during various iterations of step 310, and current values thereof are preferably utilized by the processor 220 of FIG. 2 for processing.

The target velocity is then scaled with respect to the host vehicle turn radius (step 312). Specifically, a new, scaled target velocity component is generated for a direction that is tangent to the host vehicle trajectory of step 302. The scaled velocity component corresponds to the scaled velocity $v_p$ 118 of FIG. 1. The scaled velocity component of step 312 is preferably generated by the processor 220 of FIG. 2 using the host vehicle turn center of step 304, the target location of step 306, the target velocity of step 307, the mapping of step 308, and the projected target location of step 310. In one embodiment, the scaled velocity component of step 312 is calculated using the following equation:

$$V_p = (D1/D2)^* v_j \qquad \text{(Equation 1)},$$

in which $V_p$ is the scaled velocity component, D1 represents the host vehicle turn radius of step 305 (also corresponding to the first distance D1 of FIG. 1), D2 represents the distance between the target and the host vehicle turn center of step 309 (also corresponding to the second distance D2 of FIG. 1), and $v_j$ represents the velocity component of the target perpendicular to the radius 106 from the turn center 108 of FIG. 1, from step 307 (also corresponding to the velocity component $v_j$ 114 of FIG. 1). The scaled velocity component is preferably generated continuously during vehicle operation during various iterations of step 312, and current values thereof are preferably utilized by the processor 220 of FIG. 2 for processing.

In addition, a distance is calculated between the host vehicle and the projected target location of step 310 along the host vehicle trajectory (step 314). The distance of step 314 is preferably calculated by the processor 220 of FIG. 2 using the host vehicle location of step 303, the target location of step 306, the mapping of step 308, and the projected target location of step 310. In one embodiment, the distance of step 312 is calculated using the following equation:

$$D3 = (\text{First Angle} - \text{Second Angle})^* D1 \qquad \text{(Equation 2)},$$

in which D3 is the distance between host vehicle and the projected target location (corresponding to the third distance D3 of FIG. 1), the First Angle represents the angle between the host vehicle and the host vehicle turn center (corresponding to the first angle 109 of FIG. 1) generated from the mapping of step 308, the Second Angle represents the angle between the target and the host vehicle turn center (corresponding to the second angle 111 of FIG. 1) also generated from the mapping of step 308, and D1 represents the host vehicle turn radius of step 305 (corresponding to the first distance D1 of FIG. 1). The First Angle and the Second Angle are both represented in radians. The distance between the host vehicle and the projected target location is preferably generated continuously during vehicle operation during various iterations of step 314, and current values thereof are preferably utilized by the processor 220 of FIG. 2 for processing.

A distance is also calculated between the target and the projected target location (step 315). The distance of step 315 is preferably calculated by the processor 220 of FIG. 2 using the host vehicle turn radius of step 305 and the distance between the target and the host vehicle turn center of step 309. In one embodiment, the distance between the target and the projected target location of step 315 is calculated using the following equation:

$$D4 = D1 - D2 \qquad \text{(Equation 3)},$$

in which D4 is the distance between the target and the projected target location (corresponding to the fourth distance D4 of FIG. 1), D1 is the host vehicle turn radius of step 305 (corresponding to the first distance D1 of FIG. 1), and D2 is the distance between the target and the host vehicle turn center of step 309 (corresponding to the second distance D2 of FIG. 1). The distance between the target and the projected target location is preferably generated continuously during vehicle operation during various iterations of step 315, and current values thereof are preferably utilized by the processor 220 of FIG. 2 for processing.

A time to path (TTP) is calculated (step 316). The time to path represents an amount of time in which the target is expected to reach the host vehicle trajectory of step 302. The time to path of step 316 preferably corresponds to the time to path (TTP) 120 of FIG. 1. The time to path is preferably calculated by the processor 220 of FIG. 2 using the target location of step 306, the target velocity of step 307, and the projected target location of step 310. Specifically, the time to path is preferably calculated using the following equation:

$$TTP = D4/v_i \qquad \text{(Equation 4)},$$

in which TTP represents the time to path, D4 represents the distance of step 315 between the target and the projected target location (corresponding to the fourth distance D4 of FIG. 1), and $v_i$ represents the target component velocity $v_i$ of step 307 along a radius from the turn center 108 of FIG. 1 toward the projected location of step 310. The time to path is preferably calculated continuously during vehicle operation during various iterations of step 316, and current values thereof are preferably utilized by the processor 220 of FIG. 2 for processing.

A time to collision (TTC) is calculated (step 318). The time to collision represents an amount of time in which the host vehicle and the target would collide if such a collision were to occur (or the time that the host vehicle would pass the target if a collision were not to occur). Specifically, the time to collision represents an amount of time in which the projected target of step 310 is expected to reach the front bumper (or center 130 of FIG. 1) of the host vehicle. The time to collision of step 318 preferably corresponds to the time to collision (TTC) 122 of FIG. 1. The time to collision is preferably calculated by the processor 220 of FIG. 2 using the host vehicle location and velocity obtained in step 302 and the projected target location of step 310. Specifically, the time to collision is preferably calculated in accordance with the following equation:

$$TTC = D3/v_p \qquad \text{(Equation 5)},$$

in which TTC represents the time to collision, D3 represents the distance between the host vehicle and the projected target location of step 314 (corresponding to the third distance D3 of FIG. 1), and $v_p$ represents the scaled velocity of step 312 (corresponding to the scaled velocity $v_p$ 118 of FIG. 1). The time to collision is preferably calculated continuously during vehicle operation during various iterations of step 318, and current values thereof are preferably utilized by the processor 220 of FIG. 2 for processing.

A determination is made as to whether the time to path of step 316 is less than or equal to the time to collision of step 318 (step 320). This determination is preferably made by the processor 220 of FIG. 2 continuously during vehicle operation during various iterations of step 318, and current values thereof are preferably utilized by the processor 220 of FIG. 2 for processing.

If it is determined that the time to path is less than or equal to the time to collision, then a determination is made that a collision is possible between the host vehicle and the target (step 322). If the process is utilized in connection with an implementation in which such collisions are not desired (such as if the target represents another vehicle or projectile on a road and such collisions are to be avoided), then an alert may be provided (step 324). The alert is provided by the audible alert generator 208 and/or the visual alert generator 210 of FIG. 2 based on instructions provided thereto by the processor 220 of FIG. 2. An audible alert may be provided by the audible alert generator and a visual alert provided by the visual alert generator. Alternatively, an audible alert may be provided without a visual alert, or vice versa. In certain circumstances, remedial action may also be taken (step 326). Such remedial action may include, by way of example, actions by one or more other vehicle systems 206 (such as vehicle braking or vehicle steering, by way of example only) implanting instructions provided to such systems by the processor 220 of FIG. 2. The process preferably returns to step 302, as the steps are repeated, preferably continuously, in a new iteration during operation of the host vehicle.

Conversely, if it is determined that the time to path is greater than the time to collision, then a determination is made that a collision is unlikely between the host vehicle and the target (step 328). If the process is utilized in connection with an implementation in which such collisions are desired (such as in the case of an airplane landing on an aircraft carrier, or other circumstances in which it is desired for one vehicle or target to land on or otherwise contact or engage with the host vehicle), then an alert may be provided (step 330). The alert is provided by the audible generator 208 and/or the visual generator of FIG. 2 based on instructions provided thereto by the processor 220 of FIG. 2. An audible alert may be provided by the audible alert generator and a visual alert provided by the visual alert generator. Alternatively, an audible alert may be provided without a visual alert, or vice versa. In certain circumstances, remedial action may also be taken (step 332). Such remedial action may include, by way of example, actions by one or more other vehicle systems 206 (such as vehicle braking or vehicle steering, by way of example only) implementing instructions provided to such systems by the processor 220 of FIG. 2. The process preferably returns to step 302, as the steps are repeated, preferably continuously, in a new iteration during operation of the host vehicle.

Figure 4:
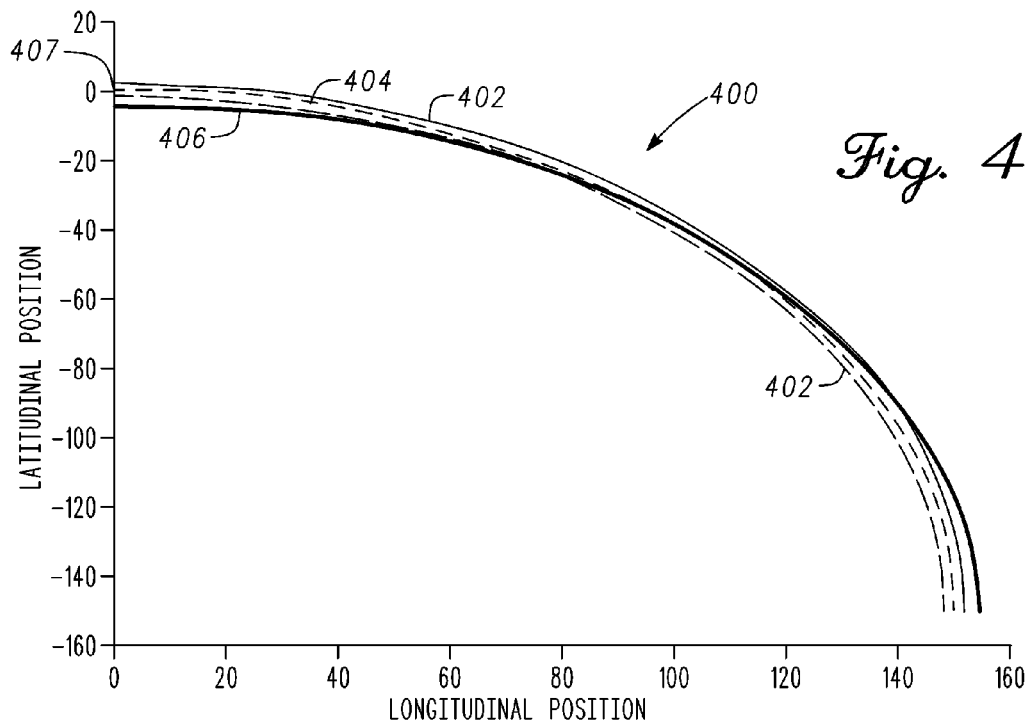
FIG. 4 is a chart showing a trajectory of a host vehicle and a relative path of a target with respect to the host vehicle in a first exemplary scenario in which a collision does not occur therebetween, in accordance with an exemplary embodiment.

FIGS. 4-9 depict certain implementations of the process 300, and illustrate potential advantages over existing techniques. First, FIG. 4 is a chart 400 showing a predicted host vehicle trajectory 404 with outer edges 402 (representing the host vehicle width), along with various target location points 406, in a first exemplary scenario in which the host vehicle and the target do not collide, in an exemplary embodiment. The host vehicle corresponds to the host vehicle 100 of FIG. 1, and the target corresponds to the target 102 of FIG. 1. Each of the target location points 406 represents an actual location or path of the target at a different point in time. The actual position of the host vehicle is depicted in FIG. 4 as a fixed point 407 (0,0). In the example of FIG. 4, the predicted host vehicle trajectory 404 and the actual target location points 406 intersect in relative terms, but the host vehicle and the target never collide. Specifically, as depicted in FIG. 4, the target location point 406 of the target (with respect to the ground) never reaches the fixed point 407 representing the absolute position of the host vehicle (with respect to the ground).

Figure 5:
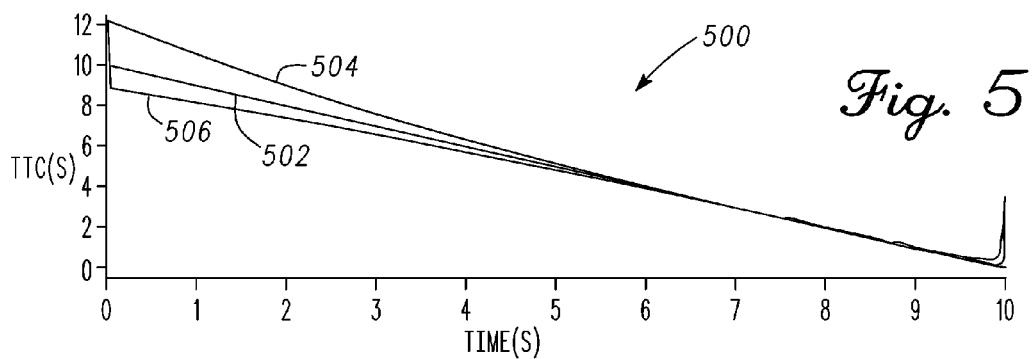
FIG. 5 is a chart showing respective determinations of a time to possible collision between the host vehicle and the path of the target in the first exemplary scenario of FIG. 4 in which a collision does not occur therebetween, including one such determination using techniques of the process of FIG. 3, in accordance with an exemplary embodiment.

FIG. 5 is a chart 500 showing respective determinations of a time to collision between the host vehicle and the target in the first exemplary scenario of FIG. 4 in which a collision does not occur therebetween, using various techniques. Specifically, the chart 500 includes a first determination 502 using techniques of the process 300 of FIG. 3, a second determination 504 using simple range over range rate calculations (without the mapping and calculations described above in connection with FIGS. 1-3), and a third determination 506 using simple range over velocity calculations (also without the mapping and calculations described above in connection with FIGS. 1-3). As shown in FIG. 5, the first determination 502 predicts, more accurately and earlier on, the time to the possible collision. For example, the first determination 502 correctly predicts approximately ten seconds out that the time to the possible collision is ten seconds.

Figure 6:
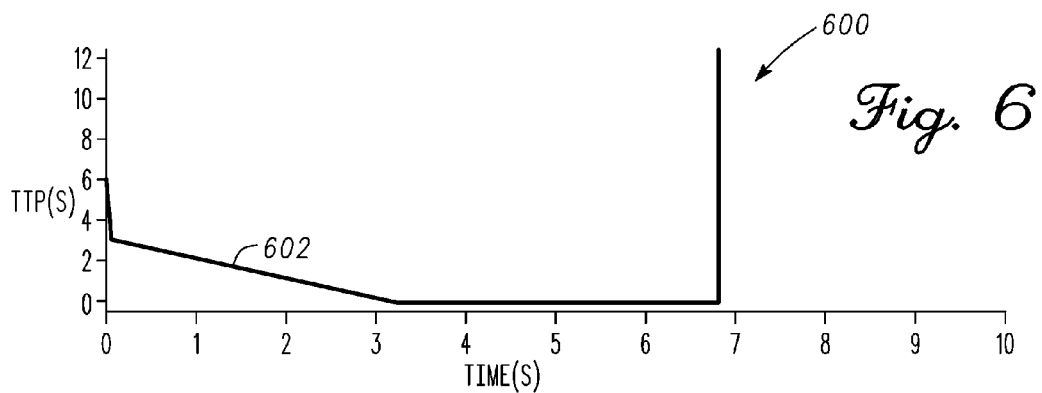
FIG. 6 is a chart showing a determination of a time to path at which the path of the target is likely to reach the trajectory of the host vehicle in the first exemplary scenario of FIG. 4 in which a collision does not occur therebetween, using techniques of the process of FIG. 3, in accordance with an exemplary embodiment.

FIG. 6 is a chart 600 showing a determination 602 of the time to path using techniques from the process 300 of FIG. 3 in the first exemplary scenario of FIG. 4 in which a collision does not occur between the host vehicle and the target, in an exemplary embodiment. Specifically, the chart 600 shows that, in this example, the target path intersects the host vehicle trajectory shortly after three seconds. A collision is then possible or likely until nearly seven seconds, at which point the target has passed the host vehicle trajectory, and a collision is no longer possible with the current vehicle trajectories.

Figure 7:
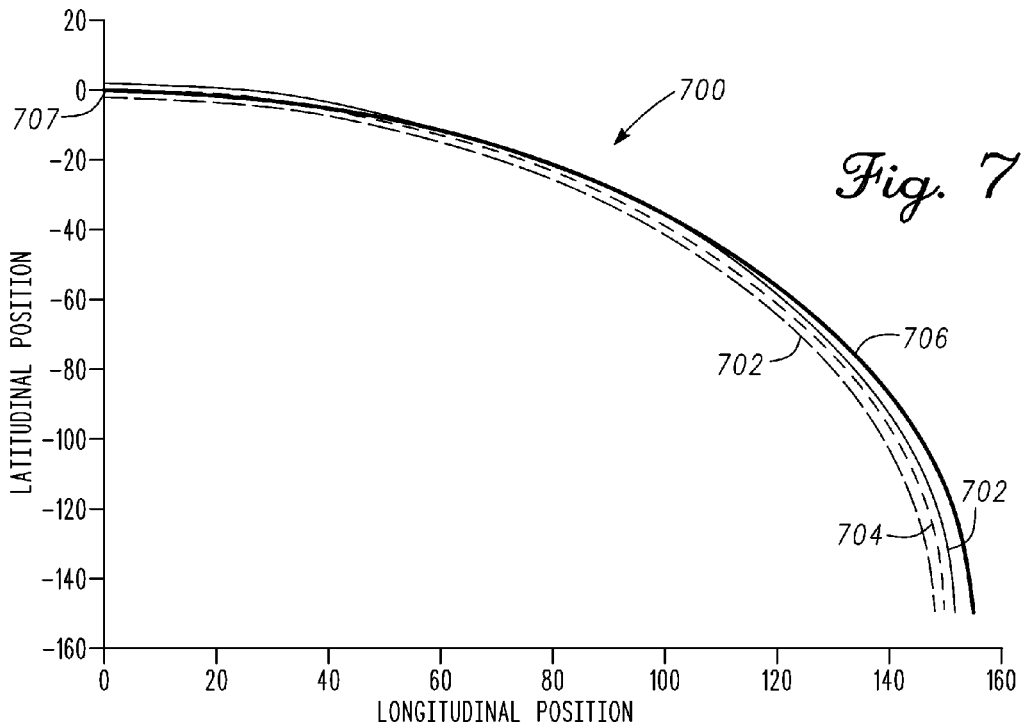
FIG. 7 is a chart showing a trajectory of a host vehicle and a relative path of a target with respect to the host vehicle in a second exemplary scenario in which a collision occurs therebetween, in accordance with an exemplary embodiment.

Turning now to FIG. 7, a chart 700 is provided showing a predicted host vehicle trajectory 704 with outer edges 702 (representing the host vehicle width), along with various target location points 706, in a second exemplary scenario in which the host vehicle and the target collide, in an exemplary embodiment. The host vehicle corresponds to the host vehicle 100 of FIG. 1, and the target corresponds to the target 102 of FIG. 1. Each of the target location points 706 represents an actual location or path of the target at a different point in time. The actual position of the host vehicle is depicted in FIG. 7 as a fixed point 707 (0,0). In the example of FIG. 7, the host vehicle and the target collide at the fixed point 707. Specifically, as depicted in FIG. 4, an absolute position of the vehicle and the actual target location point 706 (with respect to the ground) intersect at the fixed point 707, representing the collision.

Figure 8:
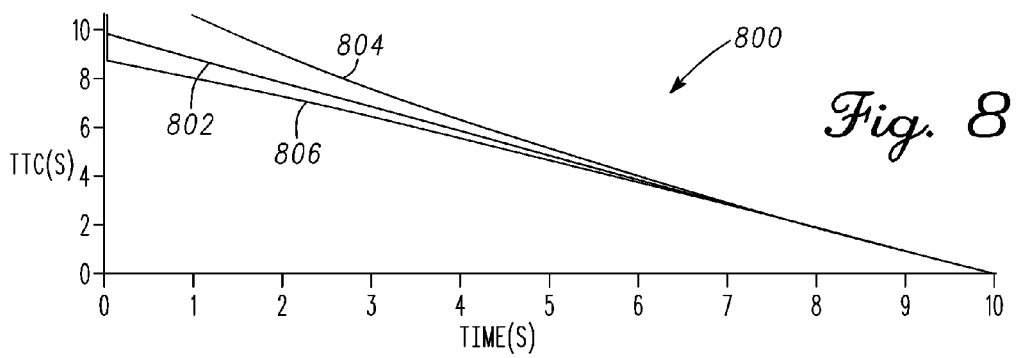
FIG. 8 is a chart showing respective determinations of a likely time to collision between the host vehicle and the path of the target in the second exemplary scenario of FIG. 7 in which a collision occurs therebetween, including one such determination using techniques of the process of FIG. 3, in accordance with an exemplary embodiment.

FIG. 8 is a chart 800 showing respective determinations of a time to collision between the host vehicle and the target in the second exemplary scenario of FIG. 7 in which a collision occurs therebetween, using various techniques, in an exemplary embodiment. Specifically, the chart 800 includes a first determination 802 using techniques of the process 300 of FIG. 3, a second determination 804 using simple range over range rate calculations (without the mapping and calculations described above in connection with FIGS. 1-3), and a third determination 806 using simple range over velocity calculations (also without the mapping and calculations described above in connection with FIGS. 1-3). As shown in FIG. 8, the first determination 802 predicts, more accurately and earlier on, the time to the possible collision. For example, the first determination 802 correctly predicts approximately ten seconds out that the time to the possible collision is ten seconds.

Figure 9:
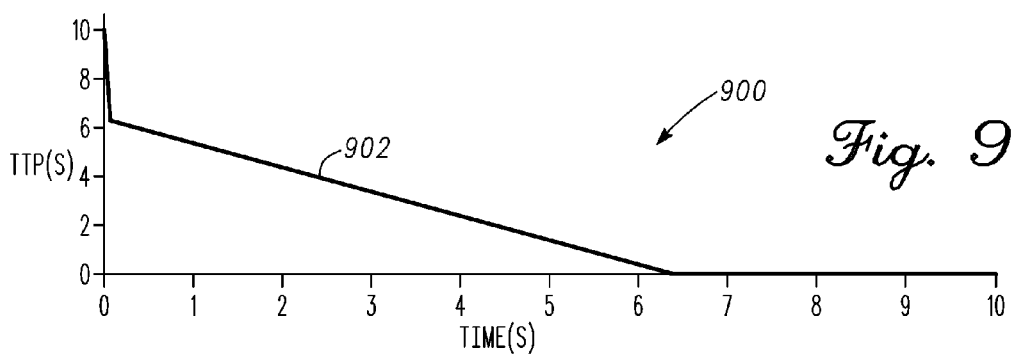
FIG. 9 is a chart determination of a time to path at which the path of the target is likely to reach the trajectory of the host vehicle in the second exemplary scenario of FIG. 7 in which a collision occurs therebetween, using techniques of the process of FIG. 3, in accordance with an exemplary embodiment.

FIG. 9 is a chart 900 showing a determination 902 of the time to path using determinations from the process 300 of FIG. 3 in the second exemplary scenario of FIG. 7 in which a collision occurs between the host vehicle and the target, in an exemplary embodiment. Specifically, the chart 900 shows that, in this example, the target path intersects the host vehicle trajectory shortly after six seconds. A collision is then possible or likely throughout the duration of this event, and the host vehicle and the target collide.

Accordingly, improved methods and systems are provided for collision assessments for vehicles. The improved methods and systems provide for more accurate prediction of collisions between a host vehicle and nearby vehicles or other targets when the host vehicle is traveling on a curved surface. For example, the disclosed methods and systems can predict with greater accuracy earlier a time in which a possible collision would occur. In addition, the disclosed methods and systems can predict with greater accuracy whether the collision will actually occur, based on the comparison of the time to collision and the time to path that are calculated using a mapping of the host vehicle and the target onto a polar coordinate system in which the host vehicle turn center represents the pole. This can in result in potentially fewer collisions and/or anxiety for the occupants of the vehicles.

It will be appreciated that the disclosed systems and processes may differ from those depicted in the Figures and/or described above. For example, the mapping, the host vehicle, the target, and/or values pertaining thereto may differ from those of FIG. 1 and/or described above. Similarly, the system 200 and/or various components thereof may differ from those of FIG. 2 and/or described above. In addition, certain steps of the process 300 may be unnecessary and/or may vary from those depicted in FIG. 3 and described above. It will similarly be appreciated that various steps of the process 300 may occur simultaneously or in an order that is otherwise different from that depicted in FIG. 3 and/or described above. The implementations may also vary from those depicted in FIG. 4-9 or described above. It will similarly be appreciated that the disclosed methods and systems may be used in connection with any number of different types of vehicles, and in connection with any number of different systems thereof and environments pertaining thereto While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for assessing a target proximate a vehicle, the method comprising the steps of: via a detection unit configured to provide information pertaining to the target;

obtaining a location and a velocity of the target and via a processor coupled to the detection unit;

mapping the location and the velocity onto a polar coordinate system, wherein a pole of the polar coordinate system comprises a turn center of the vehicle;

calculating an estimated time value at which a path of the target is expected to reach a trajectory of the vehicle using the mapping of the location and the velocity onto the polar coordinate system;

determining a likelihood that the vehicle and the target will collide using the mapping, based on the calculated estimated time value; determining a velocity component of the target along a radius from the turn center of the vehicle using the velocity; determining a closest portion of the trajectory relative to the target; and calculating a distance between the closest portion of the trajectory relative to the target and the location; wherein the estimated time value is calculated using the velocity component and the distance.

2. The method of claim 1, further comprising the steps of:

calculating a second distance between the location and the turn center; and determining a turn radius of the vehicle;

wherein the step of calculating the distance comprises the step of calculating the distance using the second distance and the turn radius.

3. The method of claim 1, further comprising the steps of:

calculating a second estimated time value at which the vehicle will contact the target if the vehicle and the target were to collide, using the mapping; and determining that a collision between the vehicle and the target is likely if the estimated time value is less than or equal to the second estimated time value.

4. The method of claim 3, further comprising the steps of:

determining a second velocity component of the target that is perpendicular to the radius from the turn center using the velocity; and calculating a third velocity component of the target that is tangent to the trajectory using the second velocity component;

wherein the second estimated time value is calculated using the third velocity component.

5. The method of claim 4, further comprising the steps of:

calculating a first angle of the vehicle relative to a polar axis of the polar coordinate system;

calculating a second angle of the target relative to the polar axis; and calculating a third distance between the vehicle and the closest portion using the first angle and the second angle;

wherein the second estimated time value is calculated using the third velocity component and the third distance.

6. A method for assessing a target proximate a vehicle, the method comprising the steps of: via a detection unit configured to provide information pertaining to the target;

identifying a location and a velocity of the target;

and identifying a turn center, a trajectory, and a turn radius of the vehicle and via a processor coupled to the detection unit;

calculating a first estimated time value at which the target is expected to reach the trajectory using the location and the velocity;

calculating a second estimated time value at which the vehicle will contact the target if the vehicle and the target were to collide using the turn center and the turn radius;

determining that a collision between the vehicle and the target is likely if the first estimated time value is less than or equal to the second estimated time value;

obtaining a velocity component of the target along a radius from the turn center; calculating a distance between the target and the turn center; calculating a second distance between the target and a closest portion of the trajectory with respect to the target using the distance and the turn radius; obtaining a second velocity component of the target that is perpendicular to the radius from the turn center; calculating a third velocity component of the target that is tangent to the trajectory using the second velocity component; calculating a first angle of the vehicle relative to a polar axis; calculating a second angle of the target relative to the polar axis; and calculating a third distance between the vehicle and the closest portion using the first angle and the second angle; wherein the first estimated time value is calculated using the third velocity component and the third distance.

7. A system for assessing a target proximate a vehicle, the system comprising:
a detection unit configured to provide information pertaining to a location and a velocity of the target; and
a processor coupled to the detection unit and configured to:
map the location and the velocity onto a polar coordinate system, generating a mapping, wherein a pole of the polar coordinate system comprises a turn center of the vehicle;
calculate an estimated time value at which a path of the target is expected to reach a trajectory of the vehicle using the mapping of the location and the velocity onto the polar coordinate system;
determine a likelihood that the vehicle and the target will collide using the mapping, based on the calculated estimated time value;
identify a velocity component of the target along a radius from the turn center of the vehicle using the velocity;
determine a closest portion of the trajectory with respect to the target; calculate a distance between the closest portion of the trajectory with respect to the target and the location; and calculate the estimated time value using the velocity component and the distance.

8. The system of claim 7, wherein the processor is further configured to:
calculate a second distance between the location and the turn center;
determine a turn radius of the vehicle; and
calculate the distance using the second distance and the turn radius.

9. The system of claim 7, wherein the processor is further configured to:
calculate a second estimated time value at which the vehicle will contact the target if the vehicle and the target were to collide using the mapping; and
determine that a collision between the vehicle and the target is likely if the estimated time value is less than or equal to the second estimated time value.

10. The system of claim 9, wherein the processor is further configured to:
identify a second velocity component of the target that is perpendicular to the radius from the turn center using the velocity;
calculate a third velocity component of the target that is tangent to the trajectory using the second velocity component; and
calculate the second estimated time value using the third velocity component.

11. The system of claim 10, wherein the processor is further configured to:
calculate a first angle of the vehicle relative to a polar axis of the polar coordinate system;
calculate a second angle of the target relative to the polar axis; calculate a third distance between the vehicle and the closest portion using the first angle and the second angle; and
calculate the second estimated time value using the third velocity component and the third distance.

12. The system of claim 7, further comprising:
an alert generator coupled to the processor and configured to provide an alert based on the likelihood that the vehicle and the target will collide.

* * * * *